Sept. 19, 1933. F. W. GAY 1,927,208
SYSTEM OF STARTING ALTERNATING CURRENT MOTORS
Filed July 9, 1931 2 Sheets-Sheet 1

INVENTOR.
Frazer W. Gay

Sept. 19, 1933.  F. W. GAY  1,927,208
SYSTEM OF STARTING ALTERNATING CURRENT MOTORS
Filed July 9, 1931   2 Sheets-Sheet 2

INVENTOR.
Frazer W. Gay

Patented Sept. 19, 1933

1,927,208

UNITED STATES PATENT OFFICE 1,927,208

SYSTEM OF STARTING ALTERNATING CURRENT MOTORS

Frazer W. Gay, Newark, N. J.

Application July 9, 1931. Serial No. 549,617

12 Claims. (Cl. 172—274)

This invention relates to a novel means of starting electrical machinery by employing windings in series connection in starting and in parallel connection running; in combination with reactance coils offering high impedance when the windings are series connected but low impedance when the windings are parallel connected. The use of current limiting reactance coils permanently connected in power circuits to limit current is common practice. I propose to so interleave these reactance coils that they offer a high impedance to currents during the starting period and a negligible impedance during normal operation.

In general I obtain this result by employing a plurality of closely interleaved coils which, during the parallel or running connection, carry currents producing magnetomotive forces in opposition so that there is no magnetic flux produced by the geometric sum of all the magnetomotive forces on a given interleaved coil group, but during the starting period the geometric sum of the magnetomotive forces in any coil group has a very substantial value and accordingly there is a large magnetic flux interlinking the coils in said coil group and producing a substantial counter voltage opposing said current.

In the preferred form I employ three coil groups so that, in starting, the coils in any coil group carry currents of different phase and produce individual magnetomotive forces which add geometrically to produce a substatnial flux which in turn produces a counter electromotive force opposing said current. With the normal running connection the currents in any coil group are all in phase and the magnetomotive forces of some coils arithmetically subtract from the magnetomotive forces produced in certain other coils so that the total magnetomotive force of any coil group is zero and hence the reactance opposed to the currents in the coils is a minimum.

Motors required to develop high starting torque, as for example industrial motors, are equipped with two windings adapted to operate in parallel star with normal running connection and to start with a series delta connection. Motors not required to develop a high starting torque, as for example the motors driving motor generator sets or blowers or compressors or pumps, are equipped according to the present invention with two windings adapted to operate in parallel delta with normal running connection and to start with a series delta connection.

In both of the above types of drive I propose to connect reactance coils in series in the winding circuits of each of the above two types of motors, and to so assemble and space said coils that with windings connected in series the reactances of said coils with respect to starting currents will be great; while with motor windings connected in the parallel or running arrangement the reactances of said coils, with respect to the normal running currents, will be relatively very low.

A principal object of the present invention is to provide a novel means for starting alternating current motors, synchronous condensers, motor generator sets, etc. said starting means being adapted to inherently provide a continuously rising voltage across the windings of the motor as the motor speed rises and the starting current diminishes.

A further object of the present invention is to continuously raise the voltage across the windings of a motor during the starting period until such voltage reaches a value adequate to maintain substantially full speed on said motor, and to provide switch means adapted upon closing to change the connections of the windings from a series to a parallel arrangement.

It is a further object of the present invention, especially in the case of induction motors having many poles, to operate said machine with windings connected in series delta during starting and light load periods, and with windings connected parallel star during heavy load periods. The power factor and efficiency of the motor is thereby improved during light load periods of operation.

Still another object of the present invention lies in the provision of a starting means of the above character which is easily operated to effect the starting of a machine, the starting action being progressive and continuous and taking place without sudden or violent current interruptions.

A further object of the present invention is to provide a starting means of the above character which merely requires the closing of switches to complete the starting operation, such switches being closed without the subsequent occurrence of high voltage or current surges.

It is a further object of this invention to start electrical machinery with a minimum starting current employing reactance coils, and means for simultaneously changing the connections of the windings and the reactances of the coils.

It is a further object of this invention to provide reactance coils having tapped turns in combination with motor windings having many turns in series between terminals, and means for reducing the number of motor winding turns in series between terminals during normal running operation, said means acting simultaneously to substantially eliminate reactance from said circuits.

In carrying out the invention in its preferred form, each phase winding of the electrical machine is wound in two winding groups, each such winding group being preferably distributed circumferentially over one half of the stator, although such exact distribution of the winding groups is not imperative, especially in machines having many poles.

Other objects and advantages will become apparent from the specification, taken in connection with the accompanying drawings in which:—

Fig. 1 shows an induction motor having two sets of stator windings $a1$, $b1$, $c1$; and $a2$, $b2$, $c2$. These motor windings are shown delta connected with reactance coils in series and connected to a three phase line by wires 1, 2, 3 and three pole switch 15.

Figure 1:
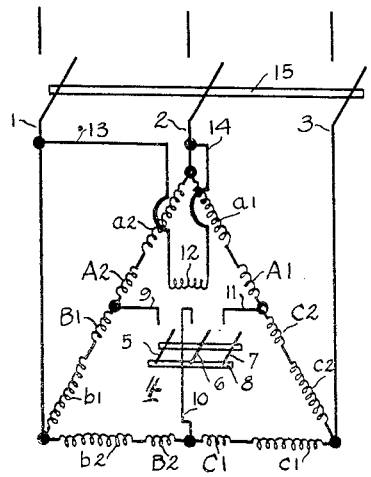
Fig. 1 is a diagrammatic representation of a three phase motor of the present invention with windings arranged in the starting connection.

Stator windings $a2$ and $b1$ are shown connected in series with reactance coils A2 and B1 across the phase 1—2.

Stator windings $c1$ and $b2$ are shown connected in series with reactance coils C1 and B2 across the phase 3—1.

Stator windings $a1$ and $c2$ are shown connected in series with reactance coils A1 and C2 across phase 2—3.

A three pole single throw contactor switch 4 is operated by closing coil 12 connected across wires 1—2 by leads 13 and 14. One pole 5 of contactor 4 is connected to neutral bar 8 at its hinge and to the junction of reactor A2 and B1 at its jaw by lead 9. The middle pole 6 of contactor 4 is connected at its hinge to neutral bar 8 and at its jaw to the junction of reactors B2 and C1 by lead 10. The third pole 7 of contactor 4 is connected at its hinge to neutral bar 8 and at its jaw to the junction of reactors A1 and C2 by lead 11.

Figure 2:
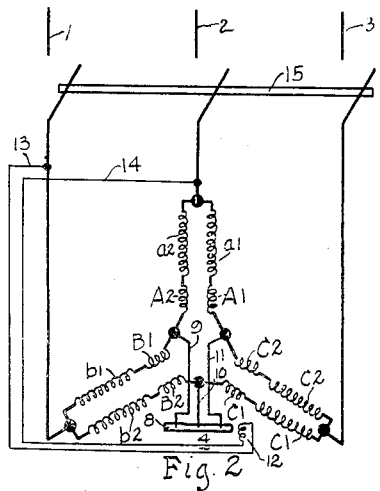
Fig. 2 is a diagrammatic representation of the same motor with windings connected for running.

Fig. 2 shows the contactor 4 closed as by the operation of closing coil 12, Fig. 1. It is seen that by the closing of contactor 4, all the windings $a1$, $a2$; $b1$, $b2$; $c1$, $c2$ are star connected to the neutral bar 8 through their reactance coils. A1 is wound opposite to A2, and B1 is wound opposite to B2, and C1 is wound opposite to C2 so that the magnetomotive forces in each pair of reactors cancel when switch 4 is closed.

Figure 3:
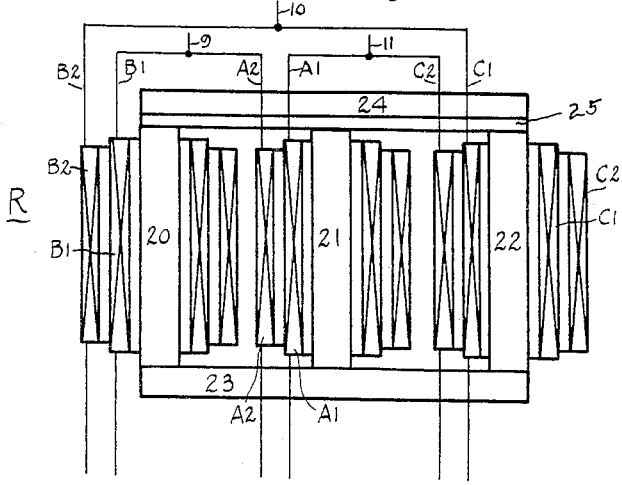
Fig. 3 is a cross sectional elevation of the reactance coils shown in Figs. 1 and 2.

Fig. 3 shows the coils A1, A2; B1, B2; C1, C2 concentrically mounted on cores 21, 20, and 22 respectively. Yokes 23 and 24 serve to close the magnetic circuits of cores 20, 21, and 22. A bar of non magnetic material 25 serves to space yoke 24 from cores 20, 21, and 22. Coils A1, A2 etc. may have taps brought out to vary their reactance or their reactance may be varied by changing the thickness of the non magnetic material 25 as is well known in the art.

The arrangement shown in Fig. 1 is primarily adapted to motors operated off lighting circuits.

Figure 4:
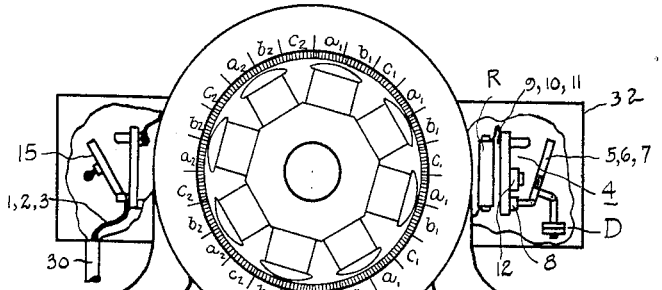
Fig. 4 is an end elevation of the motor shown in Figs. 1 and 2.

Fig. 4 shows motor M of Fig. 1 with the switch 15 of Fig. 1 mounted in a box to which the wires 1, 2, 3 are brought in by pipe 30. A box 32 is shown mounted on the other side of the motor containing the reactance coils R shown in Fig. 3 and the three pole contactor switch 4 of Fig. 1 having its blades 5, 6, 7 connected by neutral bar 8 and operated by closing coil 12. Wires 9, 10, 11 are shown coming from reactor R to the jaw clips of switch 4.

Figure 5:
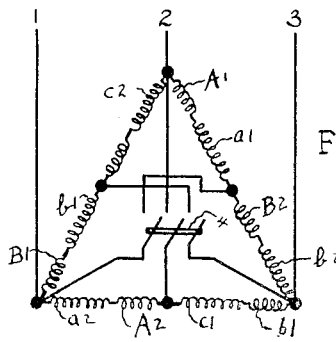
Fig. 5 is a diagrammatic representation of a modified form of the invention in the starting connection.

Fig. 5 shows a method of applying the reactance coils illustrated in Fig. 3 to a motor winding, as fully described in my U. S. Patent No. 1,849,519.

Figure 6:
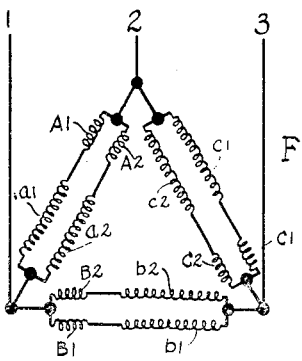
Fig. 6 is a diagrammatic representation of the motor in Fig. 5 in the running connection.

Fig. 6 shows the connection of the windings shown in Fig. 5 after contactor 4 has closed and connected the stator windings, and reactor windings in multiple. Coils A1 and A2 are oppositely wound as in Fig. 3 so that for the connection shown in Fig. 6 their reactance is negligible.

Figure 7:
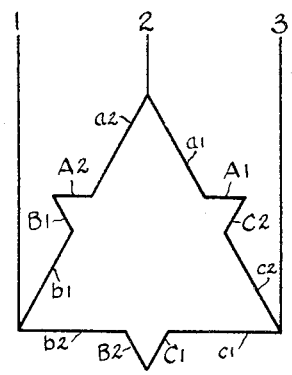
Fig. 7 is a diagram to illustrate the vector relation of the voltages during the starting operation with motor connections shown in Fig. 1.

Fig. 7 shows that coils A1 and A2 shown in Fig. 1 have a reactance voltage substantially the same as phase 1—3, since one of these coils A2 is in phase 1—2 and the other coil A1 is in phase 2—3, the resultant magnetizing force is in phase with the 1—3 phase current. In the same manner the counter electromotive forces in coils B1, B2 are in phase with the voltage of phase 2—3, and the counter electromotive force developed in the reactors C1 and C2 is the same as the voltage of phase 1—2.

Figure 8:
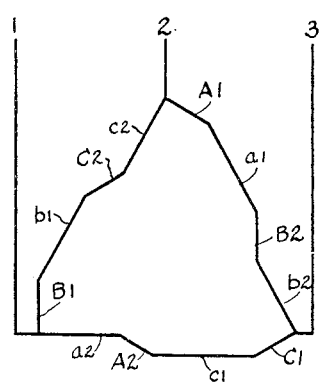
Fig. 8 is a diagrammatic representation of the motor in Fig. 5 to show the vector relations of voltages in the reactance coils with starting connection.

In the same manner Fig. 8 shows the vector relation of the counter E. M. Fs. of the reactance coils shown in Fig. 5 with respect to the counter E. M. F. of the windings $a1$, $a2$; $b1$, $b2$; $c1$, $c2$.

Figure 9:
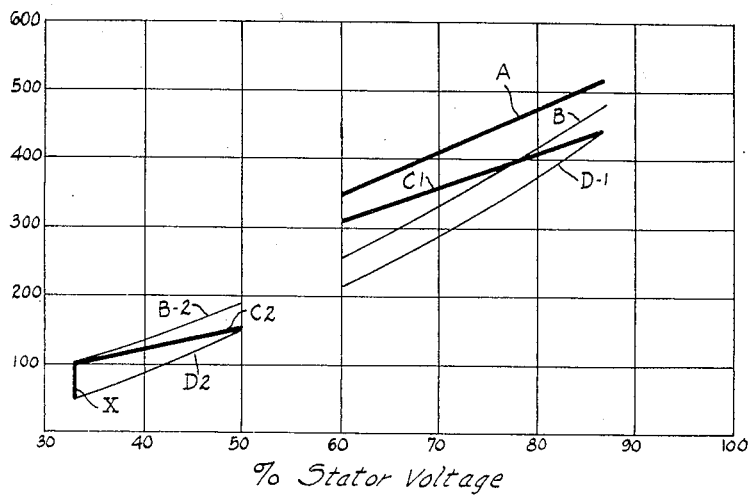
Fig. 9 is a graph illustrating the current consumption of motors of the present invention in comparison with standard motors.

Fig. 9 shows a graph illustrating the current taken by an induction motor having a locked stator current six times normal with various voltages between 33 and 86% applied to the stator. Per cent starting current taken from the line is plotted as ordinate and per cent stator voltage as abscissa.

Curve D—1 shows the starting current that would be taken from the line by such an induction motor requiring high starting torque and starting through the range 60 to 86% stator voltage if the voltage were stepped down from the line to the motor by a perfect auto transformer i. e. a transformer having no leakage current and no impedance.

Curve B shows the approximate current actually taken from the line including that used by a transformer.

Curve A shows the approximate current taken from the line with the conventional reactance or resistance starter.

Curve C—1 shows the approximate current taken from the line by a motor requiring high starting torque and connected in accordance with the preferred arrangement shown in Figs. 1, 2, and 7.

Curve D—2 shows the line current that would be taken by a motor requiring low starting torque through the range of starting voltage from 33½% to 50% if the voltage were stepped down to the motor stator by a perfect transformer i. e. a transformer having no leakage current and no impedance.

Curve B—2 shows the approximate current actually taken from the line including that used by a transformer.

Curve C—2 shows the approximate current taken from the line by a motor requiring low starting torque and connected in accordance with the scheme illustrated in Figs. 5, 6, and 8.

The operation of this arrangement is as follows. When it is desired to start the motor (Fig. 4) switch 15 (Fig. 1 and Fig. 4) is closed and closing coil 12 of contactor switch 4 is thereby energized. The closing of contactor switch 4 is delayed by the operation of a dash pot shown at D, Fig. 4. The motor starts with the stator winding phase groups $a1$, $b1$, $c1$ making up the windings on one side of the stator respectively in series with the stator winding phase groups $c2$, $a2$, $b2$ making up the windings on the other side of the stator.

Reactor coils A2, B1 are connected in series with stator winding groups $a2$, $b1$. Reactor coils C1, B2 are connected in series with stator winding groups $c1$, $b2$. Reactor coils A1, C2 are connected in series with stator winding groups $a1$, $c2$. Now if 20% of the stator voltage across phase 1, 2 is absorbed by the reactor coils A2, B1 then 80% will be absorbed by the stator winding groups $a2$, $b1$ or substantially 40% by $a2$ and 40% by $b1$. Also similarly located winding groups $b2$ and $c1$; and $c2$ and $a1$ will each absorb 40% of the stator voltage. Dash pot D may be adjusted to allow as slow a closing of contactor 4 as desired so as to allow the motor (Fig. 4) to come up to speed before contactor 4 closes.

Now it is well known that as a motor comes up to speed its starting current diminishes, hence as the motor shown in Fig. 4 comes up to speed the current in reactance coils as A2, B1 will diminish and the per cent stator voltage absorbed by these coils will diminish. It follows therefore that as the motor comes up to speed the voltage impressed on its stator winding phase groups will increase approaching 50% at nearly synchronous speed. This characteristic of rising stator voltage with speed is particularly desirable in the starting of synchronous motors as well as motors driving fans and pumps which generally require a higher voltage as they pull up to full speed than is required to start them. After contactor 4 has closed the stator windings are connected in a standard parallel star connection as shown in Fig. 2. In the standard connection shown in Fig. 2 the currents in reactor coils A1 and A2 are numerically equal and their equal magnetomotive forces are directly opposed so that the reactances of these coils are substantially nil. It follows therefore that when contactor 4 is closed and the stator windings are in star connection as shown in Fig. 2, the voltage across any phase group as $a1$ or $a2$ is 58% of the line voltage.

When the phase winding groups are connected as shown in Fig. 1 reactor coil A2 carries a current from phase 1—2 and reactor coil A1 mounted on the same core with A2 carries a current from phase 2—3. These two currents are 60 electrical degrees displaced and the two magnetomotive forces produced by these numerically equal currents add up geometrically to form a magnetomotive force which is in time phase with the third current that is the current in the 1—3 phase. It follows therefore that while the reactance voltage in coils $a2$, $b1$ at starting will substantially directly oppose the phase voltage 1—2, the reactance voltage across reactor coil A2 will be substantially opposed to the voltage across phase 1—3 as shown in Fig. 7. In the same manner it can be shown that the reactance voltage induced in coils B1, B2 is opposed to the voltage impressed on the 2—3 phase and the reactance voltage induced in coils C1, C2 is opposed to the voltage impressed on the 1—2 phase. These voltage relationships are shown diagrammatically in Fig. 7. The principles of this invention are shown, in Figs. 5, 6, and 8, applied to the alternating current motor starting system fully described in my U. S. patent application serial No. 457,073.

In Fig. 5 are shown the series connections of two stator winding phase groups $a1$, $b1$, $c1$ and $a2$, $b2$, $c2$ connected in pairs in series relation in the delta starting connection.

Fig. 6 shows these stator winding phase groups in the parallel delta running condition which exists after switch 4 (Fig. 5) is closed. Coils A1 and A2 are wound in close inductive relation and are shown connected in Fig. 6 so that their magnetomotive forces are equal and opposite. B1, B2; C1, C2 are similarly connected. When switch 4 (Fig. 5) is closed phase winding group $c2$ is thrown 60 electrical degrees from phase 1—2 to phase 2—3 and phase winding group $c1$ is thrown 60 electrical degrees in the opposite direction, i. e. from phase 1—3 to phase 2—3. It is therefore seen that upon closing switch 4, phase winding group $c^1$ and its series connected reactor C1 is displaced 120 electrical degrees with respect to phase winding group $c2$ and its series connected reactor C2. The reactors C1 and C2 which are shown connected in Fig. 6 to have magnetomotive forces bucking will when connected like Fig. 5 have magnetomotive forces 1.73 times the magnetomotive force of one coil say C1.

Fig. 8 is a diagrammatic representation of the reactance voltages of the reactors and stator winding phase groups connected for starting as shown in Fig. 5.

As many changes could be made in the above construction and many apparently widely different embodiments of this invention could be made thereof, it is intended that all matter contained in the above description or shown in the accompanying drawings shall be interpreted as illustrative and not in a limiting sense.

What is claimed is:—

1. An alternating current motor having six equal turn winding groups, said winding groups being permanently connected in series to form a closed electrical circuit; a three phase power circuit having three phase wires, the phase wires of said circuit being connected respectively to points in said closed electrical circuit located between alternate winding groups; and a three pole single throw switch having its three poles mutually connected together and arranged on closing to have its poles respectively connected to those three points in said closed electrical circuit between alternate winding groups so that upon closing said switch said six winding groups are connected in parallel star arrangement.

2. An alternating current motor having six equal turn winding groups; a three phase circuit, respective pairs of said winding groups being connected in series relation across respective phases of said three phase circuit to form a series delta arrangement; a neutral conductor, a three pole single throw switch, each pole of said switch being arranged to be connected to a point between the two winding groups of a respective pair of winding groups, said switch upon closing connecting said three points to said neutral conductor so that said six windings are connected in a parallel star arrangement.

3. An alternating current motor having six winding groups, three of said winding groups uniformly distributed around one half of the stator and the other three winding groups occupying corresponding positions on the remaining half of the stator, said six winding groups being connected in pairs, each pair of winding groups being connected in series relation across a respective one of the three phases and the three pairs forming a series delta arrangement; a three pole switch, said winding groups constituting each series connected pair of winding groups being so chosen and said switch being so connected, that upon closing said switch said six winding groups are connected to form a parallel star stator winding, each two winding groups in parallel in this connection occupying corresponding positions in the stator halves.

4. An alternating current motor having six equal turn stator winding groups, said winding groups being solidly and permanently connected in series delta arrangement and a three pole switch connected upon closing to join said six winding groups in parallel star arrangement.

5. A motor having three winding groups uniformly distributed on one half of its stator, said three winding groups each occupying a corresponding third of the slots under each pole and a corresponding three winding groups occupying corresponding positions on the other half of said stator; a three phase circuit, corresponding winding groups in each half of said stator being connected to a common phase wire of said three phase circuit and said pairs of winding groups so formed being connected to form a series delta arrangement, the three winding groups in one half of said stator being symmetrically connected in rotation around said delta.

6. A motor having three winding groups uniformly distributed on one half of its stator, said three winding groups each occupying a corresponding third of the slots under each pole and a corresponding three windings occupying corresponding positions on the other half of said stator; a three phase circuit, corresponding winding groups in each half of said stator being connected to a common phase wire of said three phase circuit and said pairs of windings so formed being joined together in series to form a series delta arrangement, the three winding groups in one half of said stator being symmetrically connected in rotation around said delta, and a three pole single throw switch connected to join said six windings in parallel star when closed.

7. An alternating current motor having six winding groups uniformly distributed, three on each half of the stator; a three phase power circuit, two correspondingly positioned windings, one on each half of said stator being connected to a respective phase wire of said power circuit and all six windings being connected in series delta to cooperate to rotate said motor and a three pole single throw switch connected to close and join said six windings to form a two circuit star connected winding.

8. In combination, a polyphase alternating current motor comprising a phase winding having two winding groups connected in multiple for normal running connection; two reactance coils, each of said reactance coils being connected in series with a respective one of said winding groups, said two reactance coils being positioned in close inductive relation, said coils being reversely wound so that in normal running connection their magnetomotive forces substantially cancel and switch means connected to said motor, said switch means operating to cause said two winding groups to carry currents of different phase during the starting of said motor.

9. In a three phase power circuit; a three phase motor having six stator windings, six reactance coils, each of said reactance coils being permanently connected in series relation with a respective one of said stator windings, said six stator windings being permanently connected in series delta arrangement during starting, and switch means connected to place said six stator windings in three parallel groups of two windings per group during running operation, the two reactance coils connected in series with each two stator windings constituting a parallel group during running operation being inductively related and oppositely wound and connected to have magnetomotive forces bucking during running operation.

10. In combination, a three phase alternating current machine having three terminal leads and two winding groups and two reactance coils per phase, said winding groups and said reactance coils of each respective phase being permanently connected in series across the two terminal leads of said phase for causing said machine to operate in series delta, and switching means connected to said machine, said switching means being operable to cause each winding group and an associated series connected reactance coil to be connected across the terminal leads of a different phase of said machine so that each phase of said machine has one winding group and a series connected reactance coil operating in multiple with another winding group and a series connected reactance coil, the said two reactance coils, so connected in multiple relation in each such phase, being inductively related with respect to one another.

11. In combination, a three phase alternating current machine having three terminal leads and two winding groups and two reactance coils per phase, said winding groups and said reactance coils of each respective phase being permanently connected in series across the two terminal leads of said phase for causing said machine to operate in series delta as during starting with said reactance coils serving to lower the starting current, and switching means connected to said machine, said switching means being operable to cause the several winding groups and reactance coils to change their respective phase positions to differing phase positions for normal machine running, so that each phase of said machine during normal running has one winding group and a series connected reactance coil operating in multiple with another winding group and a series connected reactance coil, said parallel operating reactance coils of each phase being oppositely wound and inductively associated for causing their magnetomotive forces to substantially counteract one another causing their reactances to become very low during normal running so that substantially full phase voltage is impressed across the two parallel operating winding groups of each respective phase.

12. In combination, a three phase alternating current machine having three terminal leads and two winding groups and two reactance coils per phase, said winding groups and said reactance coils of each respective phase being permanently connected in series across the two terminal leads of said phase for causing said machine to operate in series delta as during starting with the magnetomotive forces of the reactance coils of each phase being additive so that said reactance coils serve to lower the starting current, and switching means connected to said machine, said switching means being operable to cause the several winding groups and reactance coils to change their respective phase positions to differing phase positions for normal machine running, so that each phase of said machine during normal running has one winding group and a series connected reactance coil operating in multiple with another winding group and a series connected reactance coil with said machine operating in parallel star, said parallel operating reactance coils of each phase being oppositely wound and inductively associated for causing their magnetomotive forces to substantially counteract one another causing their reactances to become very low during normal running so that substantially full phase voltage is impressed across the two parallel operating winding groups of each respective phase.

FRAZER W. GAY.